United States Patent
Travers et al.

(10) Patent No.: US 12,353,113 B2
(45) Date of Patent: Jul. 8, 2025

(54) OPTICAL PARAMETRIC OSCILLATOR SYSTEM

(71) Applicant: Heriot-Watt University, Edinburgh (GB)

(72) Inventors: John C. Travers, Edinburgh (GB); Federico Belli, Edinburgh (GB)

(73) Assignee: HERIOT-WATT UNIVERSITY, Edinburgh (GB)

(*) Notice: Subject to any disclaimer, the term of this patent is extended or adjusted under 35 U.S.C. 154(b) by 66 days.

(21) Appl. No.: 18/038,668

(22) PCT Filed: Nov. 26, 2021

(86) PCT No.: PCT/GB2021/053079
§ 371 (c)(1),
(2) Date: May 24, 2023

(87) PCT Pub. No.: WO2022/112783
PCT Pub. Date: Jun. 2, 2022

(65) Prior Publication Data
US 2024/0036435 A1 Feb. 1, 2024

(30) Foreign Application Priority Data
Nov. 27, 2020 (GB) .................................. 2018703

(51) Int. Cl.
*G02F 1/35* (2006.01)
*G02B 6/02* (2006.01)
(Continued)

(52) U.S. Cl.
CPC ......... *G02F 1/397* (2013.01); *G02B 6/02328* (2013.01); *G02F 1/3528* (2021.01);
(Continued)

(58) Field of Classification Search
CPC ........ G02F 1/3528; G02F 1/354; G02F 1/395; G02F 1/397
See application file for complete search history.

(56) References Cited

U.S. PATENT DOCUMENTS

| 6,151,155 A | 11/2000 | Durfee, III et al. |
| 6,501,591 B1 | 12/2002 | Kumar et al. |
| (Continued) |

FOREIGN PATENT DOCUMENTS

| CN | 102841480 | 12/2012 |
| CN | 103592804 | 2/2014 |
| (Continued) |

OTHER PUBLICATIONS

UKIPO, United Kingdom Search Report dated May 11, 2021 in Application No. GB2018703.5.
(Continued)

*Primary Examiner* — Rhonda S Peace
(74) *Attorney, Agent, or Firm* — SNELL & WILMER L.L.P.

(57) ABSTRACT

An optical parametric oscillator (OPO) system comprises an optical waveguide including a hollow core containing a fluid, wherein the optical waveguide is configured to receive pump light and to convert the pump light into signal light and idler light via a third order non-linear optical effect. The OPO system further comprises an optical feedback arrangement for recycling at least a portion of the signal light and/or for recycling at least a portion of the idler light in an optical cavity that includes the optical waveguide. The OPO system may be used, in particular though not exclusively, in metrology, gas and solid-state spectroscopy, laser-assisted manufacturing, semiconductor technology, biomedicine, healthcare, and scientific laboratory use.

20 Claims, 3 Drawing Sheets

(51) Int. Cl.
*G02F 1/39* (2006.01)
*H01S 3/094* (2006.01)
*H01S 3/108* (2006.01)

(52) U.S. Cl.
CPC ............ *G02F 1/3538* (2013.01); *G02F 1/354* (2021.01); *G02F 1/392* (2021.01); *G02F 1/395* (2013.01); *H01S 3/094015* (2013.01); *G02F 1/3513* (2013.01); *H01S 3/1083* (2013.01)

(56) References Cited

U.S. PATENT DOCUMENTS

| | | | |
|---|---|---|---|
| 6,958,855 | B2 | 10/2005 | Kumar et al. |
| 7,697,196 | B2 | 4/2010 | Harvey |
| 9,160,137 | B1* | 10/2015 | Abdolvand ........... H01S 3/0092 |
| 9,684,223 | B2 | 6/2017 | Inoue et al. |
| 9,880,446 | B2 | 1/2018 | Gottschall et al. |
| 2007/0280304 | A1 | 12/2007 | Deile et al. |
| 2008/0094636 | A1 | 4/2008 | Jin et al. |
| 2009/0141340 | A1 | 6/2009 | Sharping et al. |
| 2013/0202006 | A1 | 8/2013 | Rudolph et al. |
| 2024/0036435 | A1* | 2/2024 | Travers ................. G02F 1/3538 |
| 2024/0243541 | A1* | 7/2024 | Keyser ................... G02F 1/395 |

FOREIGN PATENT DOCUMENTS

| | | |
|---|---|---|
| CN | 107092152 | 8/2017 |
| CN | 108711732 | 5/2020 |
| DE | 102009028819 | 2/2011 |
| EP | 1205788 | 5/2002 |
| WO | 2005046064 | 5/2005 |
| WO | 2016190913 | 12/2016 |
| WO | 2017134078 | 8/2017 |

OTHER PUBLICATIONS

International Searching Authority, Written Opinion of the International Searching Authority and Search Report dated Jun. 2, 2022 in Application No. PCT/GB2021/053079.

Bill P P Kuo et al, "Widely-tunable, multi-wavelength short wave infrared light source based on fiber optical parametric oscillator", Optical Fiber Communication (OFC), Collocated National Fiber Optic Engineers Conference, 2010 Conference On (OFC/NFOEC), IEEE, Piscataway, NJ, USA, Mar. 21, 2010 (Mar. 21, 2010), pp. 1-3, XP031676826.

Anna G Ci Riolo et al: "Generation of ultrashort pulses by four wave mixing in a gas-filled hollow core fiber", Journal of Optics, Institute of Physics Publishing, Bristol GB, vol. 20, No. 12, Nov. 14, 2018 (Nov. 14, 2018), p. 125503, 10 pages, XP020332563, ISSN: 2040-8986, DOI: 10.1088/2040-8986/AAEC41 [retrieved on Nov. 14, 2018].

J. Hansryd, et al., "Fiber-based optical parametric amplifiers and their applications," IEEE J. Sel. Top. Quantum Electron., vol. 8, No. 3, pp. 506-520, May 2002.

T. Gottschall, et al., "Ultra-short pulse fiber optical parametric oscillator," Opt. Lett., https://doi.org/10.1364/OL.42.003423, vol. 42, No. 17, pp. 3423-3426, Sep. 2017.

C. Markos, et al., Hybrid photonic-crystal fiber, Reviews of Modern Physics, vol. 89, Oct.-Dec. 2017, DOI: 10.1103/RevModPhys.89.045003, pp. 045003-1-045003-55.

International Report on Patentability dated May 30, 2023 in PCT International Application No. PCT/GB2021/053079.

* cited by examiner

OPTICAL PARAMETRIC OSCILLATOR SYSTEM

CROSS REFERENCE TO RELATED APPLICATIONS

This application is a U.S. national stage entry under 35 U.S.C. § 371 of International Application No. PCT/GB2021/053079 filed Nov. 26, 2021 entitled "OPTICAL PARAMETRIC OSCILLATOR SYSTEM", which claims priority to, and the benefit of, GB Application Serial No. 2018703.5 filed on Nov. 27, 2020, entitled "OPTICAL PARAMETRIC OSCILLATOR SYSTEM." Each of the foregoing applications are hereby incorporated by reference in their entirety for all purposes.

FIELD

The present disclosure relates to an optical parametric oscillator (OPO) system based on a fluid-filled hollow-core optical waveguide and, in particular though not exclusively, to an OPO system based on a fluid-filled hollow-core optical fibre for use, in particular though not exclusively, in metrology, gas and solid-state spectroscopy, laser-assisted manufacturing, semiconductor technology, biomedicine and healthcare, and scientific laboratory use.

BACKGROUND

Tuneable light sources are required, especially in the ultraviolet region, for use in semiconductor chip metrology, biomedical and healthcare technology as well as gas and solid-state spectroscopy. Tuneable light sources may not be available for some of these technical applications and it may be necessary to use several different lasers or complex frequency conversion schemes to obtain the range of frequencies required for such technical applications. These schemes tend to be of low efficiency which increases pump power requirements and heat generation and reduces lifetime. Additionally or alternatively, these technical applications may require lamp based sources which are bulky, inefficient, sometimes dangerous, low brightness and exhibit poor spatial beam quality.

Optical parametric oscillators (OPOs) are widely-tuneable sources of coherent light. Many OPOs are based on second order non-linear optical materials (e.g. most crystals) in which pump light is converted into signal light and idler light. However, the frequency of the signal light or idler light emitted from such OPOs is limited to frequencies which are lower than a frequency of the pump light used to pump the second order non-linear optical material of the OPO since the sum of the idler and signal frequencies is equal to the pump frequency. Higher frequencies cannot be directly generated and require additional frequency conversion steps. However, such additional frequency conversion steps have a limited lifetime and low efficiency when converting to the ultraviolet spectral region.

Fibre-optic parametric oscillators (FOPOs) are also known, for example based on third order non-linear optical effects such as four-wave mixing in solid-core optical fibres. However, the tunability of the output of such known FOPOs requires a tuneable pump laser, along with a suitably designed optical fibre. This cannot be changed after manufacture, limiting the output wavelengths of such known FOPOs. Moreover, it may not be possible to generate light from such known FOPOs at frequencies in the ultraviolet or short end of the visible spectrum (violet and blue region), or in most of the mid- and far-infrared, due to the conflicting requirements between phase-matching of the pump, signal and idler waves in the optical fibre on the one hand and the transparency of the optical fibre materials on the other hand. The energy and power from known FOPOs is also limited due to the damage threshold power levels associated with the fibre materials. In addition, rapid tuning of the signal and idler frequencies generated using known FOPOs may not be possible.

SUMMARY

According to an aspect of the present disclosure there is provided an optical parametric oscillator (OPO) system, comprising:
an optical waveguide including a hollow core containing a fluid, wherein the optical waveguide is configured to receive pump light and to convert the pump light into signal light and idler light via a third order non-linear optical effect; and
an optical feedback arrangement for recycling at least a portion of the signal light and/or for recycling at least a portion of the idler light in an optical cavity that includes the optical waveguide.

The optical feedback arrangement may be configured to couple at least a portion of the signal light and/or at least a portion of the idler light out of the optical cavity.

The optical feedback arrangement may be configured to recycle the signal light in the optical cavity and to couple the idler light out of the optical cavity.

The optical feedback arrangement may be configured to recycle the idler light in the optical cavity and to couple the signal light out of the optical cavity.

The optical feedback arrangement may be configured to recycle the signal light in the optical cavity and to recycle the idler light in the optical cavity.

The optical waveguide may be configured to convert the pump light into the signal light and the idler light via four-wave mixing.

The signal light may include a signal frequency. The idler light may include an idler frequency.

The pump light may include a pump frequency. The sum of the signal frequency and the idler frequency may be equal to twice the pump frequency.

The pump light may include first and second pump frequencies, wherein the first and second pump frequencies are different. The sum of the signal frequency and the idler frequency may be equal to the sum of the first and second pump frequencies.

One or both of the frequencies of the signal light and the idler light may be in the vacuum UV, the deep UV, the UV, the visible or the IR regions of the electromagnetic spectrum.

The optical waveguide may comprise a hollow-core fluid-filled optical fibre.

The OPO system may be configured to control at least one of a composition, a temperature, a pressure, a distribution, a profile, and a concentration of the fluid in the hollow-core optical waveguide.

The OPO system may comprise a gas cell which is configured to control the supply of fluid to the optical waveguide. The gas cell may include a chamber which contains an end of the optical waveguide. The OPO system may comprise a fluid reservoir. The gas cell may comprise a valve for controlling the supply of fluid from the fluid reservoir to the chamber. The valve may be configured to control a pressure of the fluid in the chamber, for example, a partial pressure of the fluid in the chamber. The OPO system may comprise a fluid pump. The OPO system may be configured so that the fluid pump can pump fluid from the fluid reservoir to the chamber.

The OPO system may comprise a plurality of fluid reservoirs, each fluid reservoir containing a different fluid. The gas cell may comprise a plurality of valves for controlling the supply of the plurality of different fluids from the plurality of different fluid reservoirs to the chamber. Each valve may be configured to control a pressure of the corresponding fluid in the chamber, for example, a partial pressure of the corresponding fluid in the chamber. The OPO system may be configured so that the fluid pump can pump the plurality of different fluids from the plurality of different fluid reservoirs to the chamber. The OPO system may comprise a plurality of fluid pumps. The OPO system may be configured so that each fluid pump can pump a corresponding fluid from the corresponding fluid reservoir to the chamber.

The gas cell may be configured to control the temperature of the one or more fluids in the chamber. For example, the gas cell may include a heater and/or a cooler for controlling the temperature of the one or more fluids in the chamber.

The OPO system may comprise first and second gas cells, wherein the first gas cell is configured to control the supply of fluid to a first end of the optical waveguide and the second gas cell is configured to control the supply of fluid to a second end of the optical waveguide.

The first gas cell may include a chamber which contains the first end of the optical waveguide. The first gas cell may comprise a valve for controlling the supply of fluid from the fluid reservoir to the chamber of the first gas cell. The valve may be configured to control a pressure of the fluid in the chamber of the first gas cell, for example, a partial pressure of the fluid in the chamber of the first gas cell. The OPO system may comprise a first fluid pump. The OPO system may be configured so that the first fluid pump can pump fluid from the fluid reservoir to the chamber of the first gas cell.

The first gas cell may comprise a plurality of valves for controlling the supply of the plurality of different fluids from the plurality of different fluid reservoirs to the chamber of the first gas cell. Each valve may be configured to control a pressure of the corresponding fluid in the chamber of the first gas cell, for example, a partial pressure of the corresponding fluid in the chamber of the first gas cell. The OPO system may be configured so that the first fluid pump can pump the plurality of different fluids from the plurality of different fluid reservoirs to the chamber of the first gas cell. The OPO system may comprise a plurality of fluid pumps. The OPO system may be configured so that each fluid pump can pump a corresponding fluid from the corresponding fluid reservoir to the chamber of the first gas cell.

The first gas cell may be configured to control the temperature of the one or more fluids in the chamber of the first gas cell. For example, the first gas cell may include a heater and/or a cooler for controlling the temperature of the one or more fluids in the chamber of the first gas cell.

The second gas cell may include a chamber which contains the second end of the optical waveguide. The second gas cell may comprise a valve for controlling the supply of fluid from the fluid reservoir to the chamber of the second gas cell. The valve may be configured to control a pressure of the fluid in the chamber of the second gas cell, for example, a partial pressure of the fluid in the chamber of the second gas cell. The OPO system may comprise a second fluid pump. The OPO system may be configured so that the second fluid pump can pump fluid from the fluid reservoir to the chamber of the second gas cell.

The second gas cell may comprise a plurality of valves for controlling the supply of the plurality of different fluids from the plurality of different fluid reservoirs to the chamber of the second gas cell. Each valve may be configured to control a pressure of the corresponding fluid in the chamber of the second gas cell, for example, a partial pressure of the corresponding fluid in the chamber of the second gas cell. The OPO system may be configured so that the second fluid pump can pump the plurality of different fluids from the plurality of different fluid reservoirs to the chamber of the second gas cell. The OPO system may comprise a plurality of fluid pumps. The OPO system may be configured so that each fluid pump can pump a corresponding fluid from the corresponding fluid reservoir to the chamber of the second gas cell.

The second gas cell may be configured to control the temperature of the one or more fluids in the chamber of the second gas cell. For example, the second gas cell may include a heater and/or a cooler for controlling the temperature of the one or more fluids in the chamber of the second gas cell.

The first end of the optical waveguide may be located within a chamber of the first gas cell and the second end of the optical waveguide may be located within a chamber of the second gas cell.

The first gas cell may comprise a valve for controlling the supply of fluid to the chamber of the first gas cell. The second gas cell may comprise a valve for controlling the supply of fluid to the chamber of the second gas cell.

The fluid may comprise a liquid or a gas.

The fluid may comprise a gas or a liquid at different pressures and temperatures. For example, the fluid may comprise a monoatomic gas, a molecular gas or a liquid at different pressures and temperatures.

The optical feedback arrangement may comprise an output dichroic mirror for reflecting at least a portion of the signal light after emission of the signal light from the optical waveguide and/or for reflecting at least a portion of the idler light after emission of the idler light from the optical waveguide. The output dichroic mirror may be configured for transmitting at least a portion of the signal light after emission of the signal light from the optical waveguide and/or for transmitting at least a portion of the idler light after emission of the idler light from the optical waveguide.

An optical frequency of the pump light may be different from a lasing transition frequency or an absorption resonance frequency of the fluid.

The pump light may be continuous wave (CW).

The pump light comprises pulsed pump light in the form of a train of pump pulses.

The signal light may comprise pulsed signal light in the form of a train of signal pulses.

The idler light may comprise pulsed idler light in the form of a train of idler pulses.

The OPO system may comprise an optical pump source for generating the pump light.

The optical pump source may be coherent.

The optical pump source may comprise a pump laser.

The optical pump source may have a fixed optical frequency.

The optical pump source may have a variable optical frequency.

The optical pump source may be configured to generate pump light at different average power levels.

The optical pump source may be configured to generate CW pump light.

The optical pump source may be configured to generate pulsed pump light in the form of a train of pump pulses.

The optical pump source may be configured to vary a duration of the pump pulses.

The optical pump source may be configured to vary a repetition rate of the train of pump pulses.

The optical pump source may be located outside the optical cavity.

The optical cavity may be configured to receive the pump light from the optical pump source.

The optical feedback arrangement may comprise an input dichroic mirror for transmitting the pump light into the optical cavity and for reflecting the signal light after emission of the signal light from the optical waveguide and/or for reflecting the idler light after emission of the idler light from the optical waveguide.

The optical pump source may have an optical pump feedback arrangement defining an optical pump cavity. The optical pump cavity and the optical cavity of the OPO system may at least partially overlap. The optical waveguide may be located in both the optical pump cavity and the optical cavity of the OPO system.

The OPO system may comprise a variable optical delay arrangement for varying an optical path length of the optical cavity.

The variable optical delay arrangement may comprise two mirrors mounted on a translation stage or a retroreflector mounted on a translation stage.

The variable optical delay arrangement may comprise two or a combination of optically transmissive wedges in the optical cavity, and one or more translation stages for translating the optically transmissive wedges in a direction across the path of the signal light and/or the idler light in the optical cavity so as to vary a distance propagated by the signal light or the idler light through the wedges.

An optical path length of the optical cavity and/or a repetition period of the train of pump pulses may be configured so that the round-trip delay experienced by the recycled signal light in the optical cavity and/or the round-trip delay experienced by the recycled idler light in the optical cavity is equal to the repetition period of the train of pump pulses.

An optical path length of the optical cavity and/or a repetition period of the train of pump pulses may be configured so that the round-trip delay experienced by the recycled signal light in the optical cavity and/or the round-trip delay experienced by the recycled idler light in the optical cavity is an integer number of times the repetition period of the train of pump pulses.

An optical path length of the optical cavity and/or a repetition period of the train of pump pulses may be configured so that the repetition period of the train of pump pulses is an integer number of times the round-trip delay experienced by the recycled signal light in the optical cavity and/or the round-trip delay experienced by the recycled idler light in the optical cavity.

A carrier envelope offset and repetition rate of the pulsed pump light may be stabilised.

The OPO system may comprise a carrier envelope offset and repetition rate stabilization arrangement configured to stabilise a carrier envelope offset and repetition rate of the pulsed pump light.

The OPO system may comprise a carrier envelope offset and repetition rate stabilization arrangement configured to stabilise a carrier envelope offset and repetition rate of the pulsed signal light and/or to stabilise a carrier envelope offset and repetition rate of the pulsed idler light.

The OPO system may comprise a variable spectral filtering arrangement for spectrally filtering the signal light in the optical cavity and/or for spectrally filtering the idler light in the optical cavity.

The variable spectral filtering arrangement may be configured to transmit light having a wavelength in a variable spectral passband.

The variable spectral passband may have a tuneable centre wavelength and/or a variable spectral bandwidth.

The variable spectral filtering arrangement may comprise one or more dispersive elements for spatially dispersing the signal light in the optical cavity and/or spatially dispersing the idler light in the optical cavity and a variable aperture or slit which is moveable relative to the spatially dispersed signal light in the optical cavity and/or moveable relative to the spatially dispersed idler light in the optical cavity.

The OPO system may comprise a variable dispersion arrangement for controlling the spectral phase or chirp of the signal light in the optical cavity and/or for controlling the spectral phase or chirp of the idler light in the optical cavity.

The variable dispersion arrangement may comprise a pair of dispersive elements.

The variable dispersion arrangement may comprise a pair of prisms.

The variable dispersion arrangement may comprise a pair of gratings.

The variable dispersion arrangement may comprise a pair of grisms.

The variable dispersion arrangement may comprise a Bragg grating. For example, the variable dispersion arrangement may comprise a fibre Bragg grating system.

The variable dispersion arrangement may comprise one or more chirped mirrors.

The variable dispersion arrangement may comprise one or more optically transmissive plates or wedges and one or more translation stages for translating the one or more optically transmissive plates or wedges in a direction across the path of the signal light in the optical cavity and/or the idler light in the optical cavity so as to vary a distance propagated by the signal light and/or the idler light through the plates or wedges.

The variable dispersion arrangement may comprise a dispersive filter. The dispersive filter may be programmable. The dispersive filter may be an acousto-optic dispersive filter.

The OPO system may comprise an arrangement for varying an optical power of the signal light in the optical cavity and/or for varying an optical power of the idler light in the optical cavity.

The OPO system may comprise an arrangement for varying an average optical power of the signal light in the optical cavity and/or for varying an average optical power of the idler light in the optical cavity.

The OPO system may comprise an attenuator in the optical cavity. The attenuator may comprise at least one of a neutral density filter, a combination of a waveplate and a polarizer.

The OPO system may comprise an arrangement for varying the optical power of different pulses of signal light in the optical cavity and/or for varying the optical power of different pulses of idler light in the optical cavity. The arrangement for varying the optical power of different pulses of signal light in the optical cavity and/or for varying the optical power of different pulses of idler light in the optical cavity may comprise an acousto-optic device or an electro-optic device.

The OPO system may comprise a Bragg grating in the optical cavity. The Bragg grating may be integrated with the optical waveguide. The Bragg grating may be configured for dispersion compensation. The Bragg grating may be configured for back-reflection and/or for out-coupling of light from the optical waveguide. For example, the OPO system may comprise a fibre Bragg grating in the optical cavity. For example, the optical waveguide may comprise a fluid-filled optical fibre and the fibre Bragg grating may be integrated with the fluid-filled optical fibre.

The optical cavity may have a travelling-wave configuration.

The optical cavity may have a ring configuration.

The optical cavity may have a standing-wave configuration.

The optical cavity may have a linear configuration.

The optical cavity may have a Fabry-Perot configuration.

The optical cavity may define an optical path which includes a double-pass through the optical waveguide for each round trip around the optical cavity.

The optical cavity may have a travelling-wave configuration in which the pump light together with the recycled signal light and/or the recycled idler light is coupled into a first end of the optical waveguide. The OPO system may comprise a high-reflector located at a second end of the optical waveguide for back-reflecting the pump light, the signal light and the idler light emitted from the second end of the optical waveguide back into the second end of the optical waveguide. The back-reflected pump light, signal light and idler light may be coupled out of the first end of the optical waveguide. For example, the OPO system may comprise an optical circulator at the first end of the optical waveguide for this purpose.

The OPO system may comprise one or more focussing elements, such as one or more lenses or curved mirrors, for coupling the pump light into the optical waveguide.

The OPO system may comprise one or more focussing elements, such as one or more lenses or curved mirrors, for coupling recycled signal light into the optical waveguide and/or for coupling recycled idler light into the optical waveguide.

The OPO system may comprise one or more collimating elements, such as one or more lenses or curved mirrors, for collimating recycled signal light and/or for collimating recycled idler light.

The OPO system may comprise a plurality of optical waveguides, wherein each optical waveguide includes a hollow core containing a fluid, each optical waveguide is configured to receive pump light and to convert the pump light into signal light and idler light via a third order non-linear optical effect, and wherein the optical feedback arrangement is configured to recycle at least a portion of the signal light and/or for recycling at least a portion of the idler light in an optical cavity that includes the plurality of optical waveguides. Each optical waveguide may comprise a fluid-filled optical fibre.

The OPO system may comprise one or more optical elements, such as one or more lenses or curved mirrors, for coupling at least one of the pump light, the signal light and the idler light emitted from an output end of one of the optical waveguides to an input end of an adjacent one of the optical waveguides.

The OPO system may comprise one or more collimating elements, such as one or more lenses or curved mirrors, for collimating light output from the OPO system.

According to an aspect of the present disclosure there is provided an optical parametric oscillation (OPO) method, comprising:
converting pump light into signal light and idler light in a fluid-filled hollow-core optical waveguide via a third order non-linear optical effect; and
recycling at least a portion of the signal light and/or recycling at least a portion of the idler light in an optical cavity that includes the optical waveguide.

The OPO method may comprise coupling at least a portion of the signal light and/or at least a portion of the idler light out of the optical cavity.

The OPO method may comprise converting the pump light into the signal light and the idler light in the fluid-filled hollow core optical waveguide via four-wave mixing.

The signal light may include a signal frequency. The idler light may include an idler frequency.

The pump light may include a pump frequency. The sum of the signal frequency and the idler frequency may be equal to twice the pump frequency.

The pump light may include first and second pump frequencies, wherein the first and second pump frequencies are different. The sum of the signal frequency and the idler frequency may be equal to the sum of the first and second pump frequencies.

One or both of the frequencies of the signal light and the idler light may be in the vacuum UV, the deep UV, the UV, the visible or the IR regions of the electromagnetic spectrum.

The optical waveguide may comprise a hollow-core fluid-filled optical fibre.

The OPO method may comprise controlling at least one of a composition, a temperature, a pressure, a distribution, a profile and a concentration of the fluid in the hollow-core optical waveguide.

The fluid may comprise a liquid or a gas.

The OPO method may comprise selecting an optical frequency of the pump light to be different from a lasing transition frequency or an absorption resonance frequency of the fluid.

The pump light may be CW or pulsed.

The OPO method may comprise varying an average power level of the pump light.

The OPO method may comprise generating pulsed pump light in the form of a train of pump pulses.

The OPO method may comprise varying a duration of the pump pulses.

The OPO method may comprise varying a repetition rate of the train of pump pulses.

The signal light may comprise pulsed signal light in the form of a train of signal pulses.

The idler light may comprise pulsed idler light in the form of a train of idler pulses.

The OPO method may comprise varying an optical path length of the optical cavity.

The OPO method may comprise selecting an optical path length of the optical cavity and/or a repetition period of the train of pump pulses so that the round-trip delay experienced by the recycled signal light in the optical cavity and/or the round-trip delay experienced by the recycled idler light in the optical cavity is equal to the repetition period of the train of pump pulses.

The OPO method may comprise selecting an optical path length of the optical cavity and/or a repetition period of the train of pump pulses so that the round-trip delay experienced by the recycled signal light in the optical cavity and/or the round-trip delay experienced by the recycled idler light in the optical cavity is an integer number of times the repetition period of the train of pump pulses.

The OPO method may comprise selecting an optical path length of the optical cavity and/or a repetition period of the train of pump pulses so that the repetition period of the train of pump pulses is an integer number of times the round-trip delay experienced by the recycled signal light in the optical cavity and/or the round-trip delay experienced by the recycled idler light in the optical cavity.

A carrier envelope offset and repetition rate of the pulsed pump light may be stabilised.

The OPO method may comprise stabilising a carrier envelope offset and repetition rate of the pulsed pump light.

The OPO method may comprise stabilising a carrier envelope offset and repetition rate of the pulsed signal light and/or stabilising a carrier envelope offset and repetition rate of the pulsed idler light.

The OPO method may comprise spectrally filtering the signal light in the optical cavity and/or spectrally filtering the idler light in the optical cavity.

The OPO method may comprise transmitting signal light in the optical cavity having a wavelength in a variable spectral passband and/or transmitting idler light in the optical cavity having a wavelength in a variable spectral passband.

The OPO method may comprise controlling the spectral phase or chirp of the signal light in the optical cavity and/or controlling the spectral phase or chirp of the idler light in the optical cavity.

The OPO method may comprise varying an average optical power of the signal light in the optical cavity and/or varying an average optical power of the idler light in the optical cavity.

The OPO method may comprise varying the optical power of different pulses of signal light in the optical cavity and/or for varying the optical power of different pulses of idler in the optical cavity.

The optical cavity may have a ring, or a travelling-wave, configuration.

The optical cavity may have a linear, or a standing-wave, configuration.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

An optical parametric oscillator (OPO) system and associated methods will now be described by way of non-limiting example only with reference to the drawings of which.

DETAILED DESCRIPTION OF THE DRAWINGS

Figure 1:
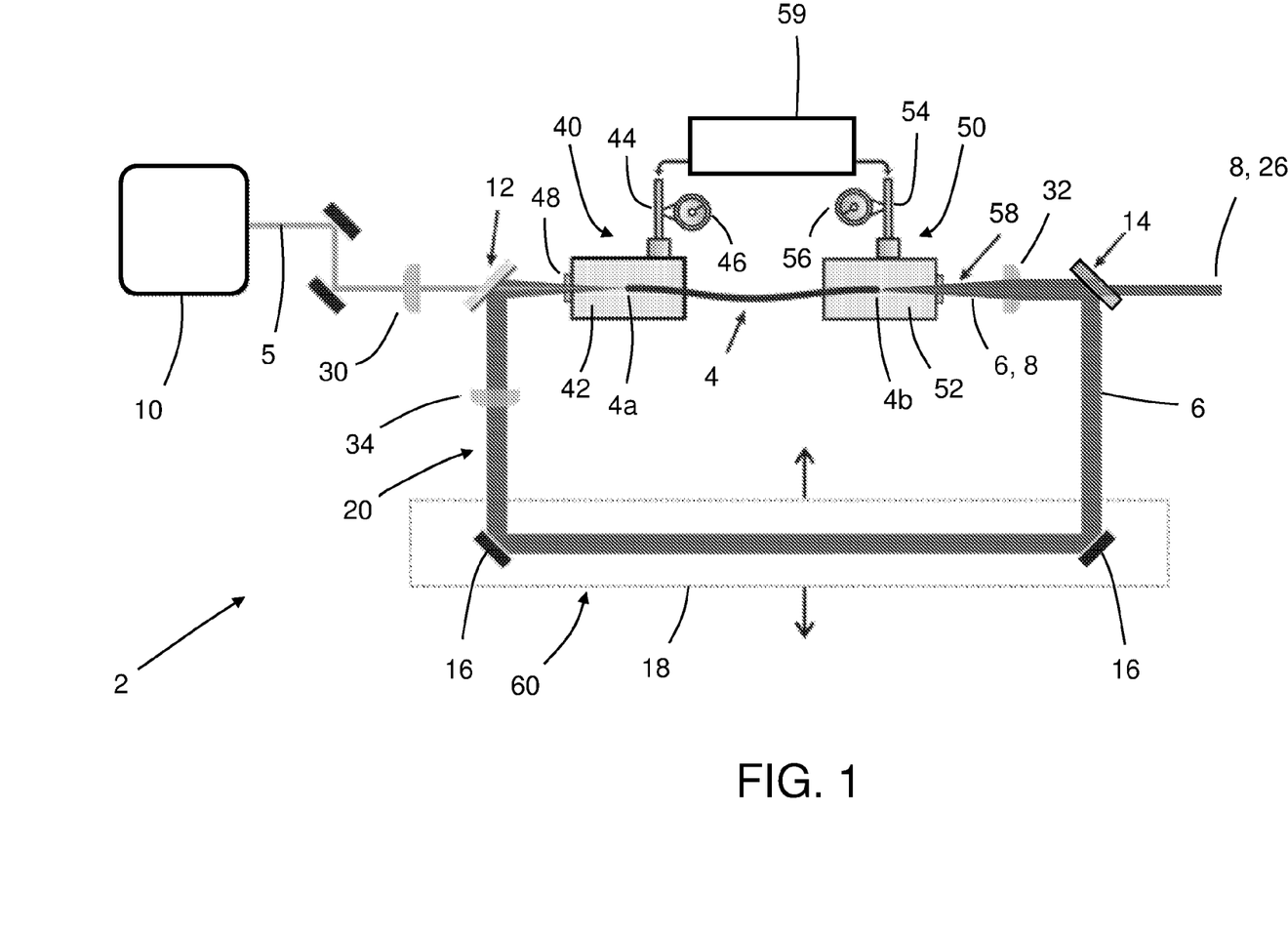
FIG. 1 is a schematic of an OPO system.

Referring initially to FIG. 1 there is shown an OPO system generally designated 2 including a hollow-core fluid-filled optical waveguide in the form of a hollow-core gas-filled optical fibre generally designated 4. As will be described in more detail below, the hollow-core gas-filled optical fibre 4 is configured to convert pump light 5 into signal light 6 and idler light 8 via a third order non-linear optical effect in the form of four-wave mixing.

The OPO system 2 includes an optical pump source in the form of a pump laser 10 for generating the pump light 5. The OPO system 2 further includes a dichroic input coupler 12, a dichroic output coupler 14 and re-direction mirrors 16. As will be described in more detail below, the dichroic input coupler 12, the dichroic output coupler 14 and the re-direction mirrors 16 together constitute an optical feedback arrangement for recycling the signal light 6 emitted from the hollow-core gas-filled optical fibre 4 in a ring, or travelling wave, optical cavity 20 which includes the hollow-core gas-filled optical fibre 4. Moreover, the optical feedback arrangement is also configured to couple the idler light 8 emitted from the hollow-core gas-filled optical fibre 4 out of the optical cavity 20 as output light 26. Specifically, the dichroic output coupler 14 is configured to be highly reflecting at a wavelength of the signal light 6 and to be highly transmitting at a wavelength of the idler light 8. The re-direction mirrors 16 are configured to be highly reflecting at a wavelength of the signal light 6. The dichroic input coupler 12 is configured to be highly transmitting at a wavelength of the pump light 5. The dichroic input coupler 12 is also configured to be highly reflecting at a wavelength of the signal light 6.

The OPO system 2 includes a pump lens 30 for coupling pump light 5 from the pump laser 10 into an input end 4a of the optical fibre 4 via the dichroic input coupler 12. The OPO system 2 further includes a collimating lens 32 for collimating signal light 6 and idler light 8 emitted from an output end 4b of the optical fibre 4 and a focusing lens 34 for focusing recycled signal light 6 into the input end 4a of the optical fibre 4.

The OPO system 2 includes a first gas cell 40 and a second gas cell 50, wherein the first gas cell 40 is configured to control a supply of gas to the input end 4a of the optical fibre 4 and the second gas cell 50 is configured to control a supply of gas to the output end 4b of the optical fibre 4. More specifically, the first gas cell 40 defines a chamber 42 which contains the input end 4a of the optical fibre 4 and the first gas cell 40 further includes a gas inlet 44 having a valve 46 for controlling the flow of gas from a gas supply 59 to the chamber 42 of the first gas cell 40. Similarly, the second gas cell 50 defines a chamber 52 which contains the output end 4a of the optical fibre 4 and the second gas cell 50 includes a gas inlet 54 having a valve 56 for controlling the flow of gas from the gas supply 59 to the chamber 52 of the second gas cell 50.

The first gas cell 40 includes a window 48 for transmitting the pump light 5 and the recycled signal light 6 and/or the recycled idler light 8 to the input end 4a of the optical fibre 4. Similarly, the second gas cell 50 includes a window 58 for transmitting the pump light 5, the signal light 6 and the idler light 8 from the output end 4b of the optical fibre 4.

In use, the pump lens 30 couples pump light 5 from the pump laser 10 into an input end 4a of the optical fibre 4 via the dichroic input coupler 12. The OPO system 2 is configured to control at least one of a composition, a temperature, a pressure, a distribution, and a profile of the gas in the hollow-core gas-filled optical fibre 4 so as to control the generation of the signal light 6 and the idler light 8 in the hollow-core gas-filled optical fibre 4. Specifically, the OPO system 2 is configured to control at least one of a composition, a temperature, a pressure, a distribution, and a profile of the gas in the hollow-core gas-filled optical fibre 4 so as to control the dispersion in the hollow-core gas-filled optical fibre 4 and the respective propagation constants or wavevectors of the pump light 5, the signal light 6 and the idler light 8 in the hollow-core gas-filled optical fibre 4 for phase-matching of the four-wave mixing process and optimization of the parametric gain in the hollow-core gas-filled optical fibre 4 for the efficient generation of the signal light 6 and the idler light 8. As will be understood by one of ordinary skill in the art, in general, the pump light 5 includes first and second pump frequencies, wherein the first and second pump frequencies are the same or different, and wherein the sum of the frequencies of the signal light 6 and the idler light 8 is equal to the sum of the first and second pump frequencies.

The signal light 6, the idler light 8 and any remaining pump light 5 are emitted from the optical fibre 4. Specifically, the signal light 6, the idler light 8 and any remaining pump light 5 are emitted from the output end 4*b* of the optical fibre 4. The collimating lens 32 collimates the signal light 6 and idler light 8, and any remaining pump light 5, emitted from the output end 4*b* of the optical fibre 4. The dichroic output coupler 14 reflects the signal light 6 incident on the dichroic output coupler 14 and transmits the idler light 8 incident on the dichroic output coupler 14 so as to provide output light 26. The signal light 6 reflected by the dichroic output coupler 14 is then recycled back into the input end 4*a* of the optical fibre 4 via the re-direction mirrors 16, the focusing lens 34 and the dichroic input coupler 12.

One of ordinary skill in the art will understand that the OPO system 2 may be operated continuous-wave (CW). For example, the optical pump laser 10 may be a continuous-wave (CW) optical pump laser 10.

Alternatively, the OPO system 2 may be operated pulsed. For example, the optical pump laser 10 may be a pulsed optical pump laser 10. The OPO system 2 may include a variable optical delay arrangement generally designated 60 for varying an optical path length of the optical cavity 20 to ensure temporal overlap in the optical fibre 4 between a subsequent pump pulse 5, a signal pulse 6 and an idler pulse 8. The variable optical delay arrangement 60 includes a translation stage 18 and the two re-direction mirrors 16 mounted on the translation stage 18. The translation stage 18 may be motor-controlled or piezo-electric. If operated pulsed, the optical path length of the optical cavity 20 may be selected to ensure temporal overlap in the optical fibre 4 between a recycled signal pulse 6 and a subsequent pump pulse 5 i.e. the OPO system 2 may be synchronously pumped. A synchronously-pumped pulsed OPO system will be described in more detail below with reference to FIGS. 2 and 3.

From the foregoing description, one of ordinary skill in the art will understand that the OPO system 2 enables a pump laser 10, at a fixed frequency, to be converted to widely-tuneable light at both a higher idler frequency and a lower signal frequency, with the signal and idler frequencies determined by the properties of the pump laser 10, the structure of the optical fibre 4, the properties of the gas contained in the hollow core of the optical fibre 4 including at least one of the composition, temperature, pressure, distribution, and profile of the gas in the hollow core of the optical fibre 4, the properties of the optical elements 32, 14, 16, 34 and 12 in the optical cavity 20, and the arrangement of the optical elements 32, 14, 16, 34 and 12 in the optical cavity 20. The use of a hollow-core fluid-filled optical fibre may provide lower group velocity dispersion in the hollow-core fluid-filled optical fibre and therefore a broader phase-matching bandwidth compared with known fibre OPOs based on solid-core optical fibres. In effect, this allows the OPO system 2 to be tuned across a wider tuning range than known fibre OPOs based on solid-core optical fibres. The signal and idler frequencies may be located in the vacuum ultraviolet, deep ultraviolet, visible and infrared region of the electromagnetic spectrum. The signal light 6 and idler light 8 can be in spectral ranges outside the transmission band of glass-fibres and crystal materials. Both the frequency and spectral bandwidth of the light output 26 from the OPO system 2 can be tuned, for example by spectrally filtering the recycled signal light 6. The frequency of the light output 26 from the OPO system 2 can be tuned rapidly in real time and the spectral bandwidth of the light output from the OPO system 2 can be varied rapidly in real time using a variable spectral filtering arrangement.

The pump and output optical power levels can be very high and the lifetime of the OPO system 2 can be highly extended relative to known fibre OPOs based on solid-core optical fibres. Conversely, the use of the hollow-core fluid-filled optical fibre 4 may result in the same output optical power level for a lower optical pump power level relative to known fibre OPOs based on solid-core optical fibres.

One of ordinary skill in the art will also understand that the optical frequency of the pump light 5 is different from a lasing transition frequency or an absorption resonance frequency of the gas in the hollow core of the optical fibre 4 and that the OPO system 2 does not require an active lasing transition to emit the signal light 6 and the idler light 8. In other words, the gas in the hollow core of the optical fibre 4 does not need to exhibit a lasing transition at the frequency of operation or store any energy.

Figure 2:
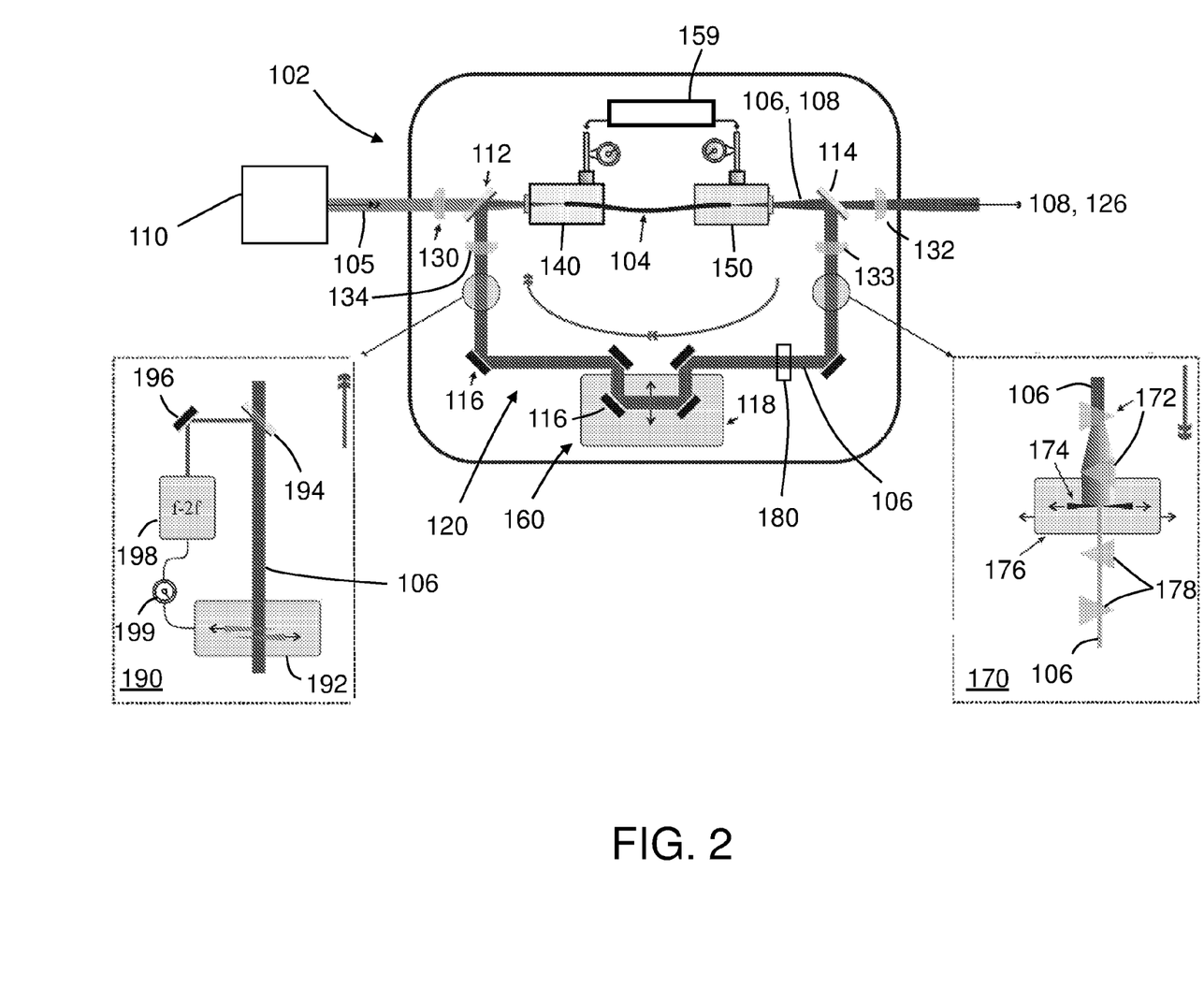
FIG. 2 is a schematic of a synchronously-pumped pulsed OPO system.

A synchronously-pumped pulsed OPO system 102 will now be described with reference to FIGS. 2 and 3. The synchronously-pumped pulsed OPO system 102 includes features which correspond closely to the features of the OPO system 2 of FIG. 1, with like features of the OPO system 102 having the same reference numeral as the corresponding features of the OPO system 2 of FIG. 1 incremented by "100". Specifically, the OPO system 102 includes a hollow-core fluid-filled optical waveguide in the form of a hollow-core gas-filled optical fibre generally designated 104. As will be described in more detail below, the hollow-core gas-filled optical fibre 104 is configured to convert pulsed pump light 105 into pulsed signal light 106 and pulsed idler light 108 via a third order non-linear optical effect in the form of four-wave mixing.

The OPO system 102 includes a pulsed optical pump source in the form of a pulsed pump laser 110 for generating the pulsed pump light 105. The OPO system 102 further includes a dichroic input coupler 112, a dichroic output coupler 114 and re-direction mirrors 116. As will be described in more detail below, the dichroic input coupler 112, the dichroic output coupler 114 and the re-direction mirrors 116 together constitute an optical feedback arrangement for recycling the pulsed signal light 106 emitted from the hollow-core gas-filled optical fibre 104 in a ring, or travelling wave, optical cavity 120 which includes the hollow-core gas-filled optical fibre 104. Moreover, the optical feedback arrangement is also configured to couple the pulsed idler light 108 emitted from the hollow-core gas-filled optical fibre 104 out of the optical cavity 120 as pulsed output light 126. Specifically, the dichroic output coupler 114 is configured to be highly reflecting at a wavelength of the signal light 106 and to be highly transmissive at a wavelength of the idler light 108. The re-direction mirrors 116 are configured to be highly reflecting at the wavelength of the signal light 106. The dichroic input coupler 112 is configured to be highly transmitting at a wavelength of the pump light 105. The dichroic input coupler 112 is also configured to be highly reflecting at a wavelength of the signal light 106.

The OPO system 102 includes a pump lens 130 for coupling pump light 105 from the pump laser 110 into the optical fibre 104 via the dichroic input coupler 112. The OPO system 102 further includes a collimating lens 132 for collimating idler light 108 transmitted by the dichroic output coupler 114, a further collimating lens 133 for collimating recycled signal light 106 reflected by the dichroic output coupler 114, and a focusing lens 134 for focusing recycled signal light 106 back into the optical fibre 104.

The OPO system 102 includes a first gas cell 140 and a second gas cell 150, wherein the first gas cell 140 is configured to control a supply of gas from a gas supply 159 to an input end of the optical fibre 104 and the second gas cell 150 is configured to control a supply of gas from the gas supply 159 to an output end of the optical fibre 104.

The OPO system 102 includes a variable optical delay arrangement generally designated 160 for varying an optical path length of the optical cavity 120 to ensure temporal overlap in the optical fibre 104 between a subsequent pump pulse 105, a signal pulse 106 and an idler pulse 108. The variable optical delay arrangement 160 includes a translation stage 118 having two of the re-direction mirrors 116 mounted on the translation stage 118. The translation stage 118 may be motor-controlled or piezo-electric. As will be described in more detail below, the variable optical delay arrangement 160 may also be used to control the average and/or peak power of the pulsed output light 126.

The OPO system 102 further includes a variable spectral filtering arrangement generally designated 170 for spectrally filtering the pulsed signal light 106 in the optical cavity 120. The variable spectral filtering arrangement 170 includes a first pair of prisms 172, a variable aperture or slit 174 mounted on a translation stage 176, and a second pair of prisms 178.

The OPO system 102 further includes an optical power control arrangement 180 such as a neutral density absorptive filter, a waveplate/polarizer combination, or an acousto-optic attenuator for controlling the optical power of the recycled pulsed signal light 106.

The OPO system 102 further includes a carrier envelope offset and repetition rate stabilization arrangement generally designated 190 for stabilising the carrier envelope offset and repetition rate of the signal light 106. The carrier envelope offset and repetition rate stabilization arrangement 190 includes a fast, finely-tuneable variable optical delay arrangement 192 which includes a pair of optically transmissive wedges and one or more piezo-electric stages for translating each of the optically transmissive wedges in a direction across the path of the pulsed signal light 106 in the optical cavity 120 so as to vary a distance propagated by the pulsed signal light 106 in the optical cavity 120 through the optically transmissive wedges to thereby vary the round-trip delay experienced by the pulsed signal light 106 in the optical cavity 120 on a sub-fs time scale. The carrier envelope offset and repetition rate stabilization arrangement 190 further includes a partially reflecting mirror 194, a highly reflective re-direction mirror 196, an f-2f detector arrangement 198 and a controller 199.

In use, the pulsed pump laser 110 generates pulsed pump light 105 which is coupled into the hollow-core gas-filled optical fibre 104 via the pump focussing lens 130 and the dichroic input coupler 112. The OPO system 102 is configured to control at least one of a composition, a temperature, a pressure, a distribution, and a profile of the gas in the hollow-core gas-filled optical fibre 104 so as to control the generation of the pulsed signal light 106 and the pulsed idler light 108 in the hollow-core gas-filled optical fibre 104. Specifically, the OPO system 102 is configured to control at least one of a composition, a temperature, a pressure, a distribution, and a profile of the gas in the hollow-core gas-filled optical fibre 104 so as to control the dispersion in the hollow-core gas-filled optical fibre 104 and the respective propagation constants or wavevectors of the pulsed pump light 105, the pulsed signal light 106 and the pulsed idler light 108 in the hollow-core gas-filled optical fibre 104 for phase-matching of the four-wave mixing process and gain optimization in the hollow-core gas-filled optical fibre 104 for the efficient generation of the pulsed signal light 106 and the pulsed idler light 108. As will be understood by one of ordinary skill in the art, in general, the pump light 105 includes first and second pump frequencies, wherein the first and second pump frequencies are the same or different, and wherein the sum of the frequencies of the signal light 106 and the idler light 108 is equal to the sum of the first and second pump frequencies.

The pulsed signal light 106, the pulsed idler light 108 and any remaining pulsed pump light 105 are emitted from an output end of the optical fibre 104. The dichroic output coupler 114 reflects the pulsed signal light 106 incident on the dichroic output coupler 114 and transmits the pulsed idler light 108 incident on the dichroic output coupler 14 so as to provide pulsed output light 126. The collimating lens 132 collimates the pulsed output light 126.

The pulsed signal light 106 reflected by the dichroic output coupler 114 is then recycled back into the optical fibre 104 via the further collimating lens 133, the variable spectral filtering arrangement generally designated 170, the re-direction mirrors 116, the variable optical delay arrangement 160, the carrier envelope offset and repetition rate stabilization arrangement 180, the focusing lens 134 and the dichroic input coupler 112.

Figure 3:
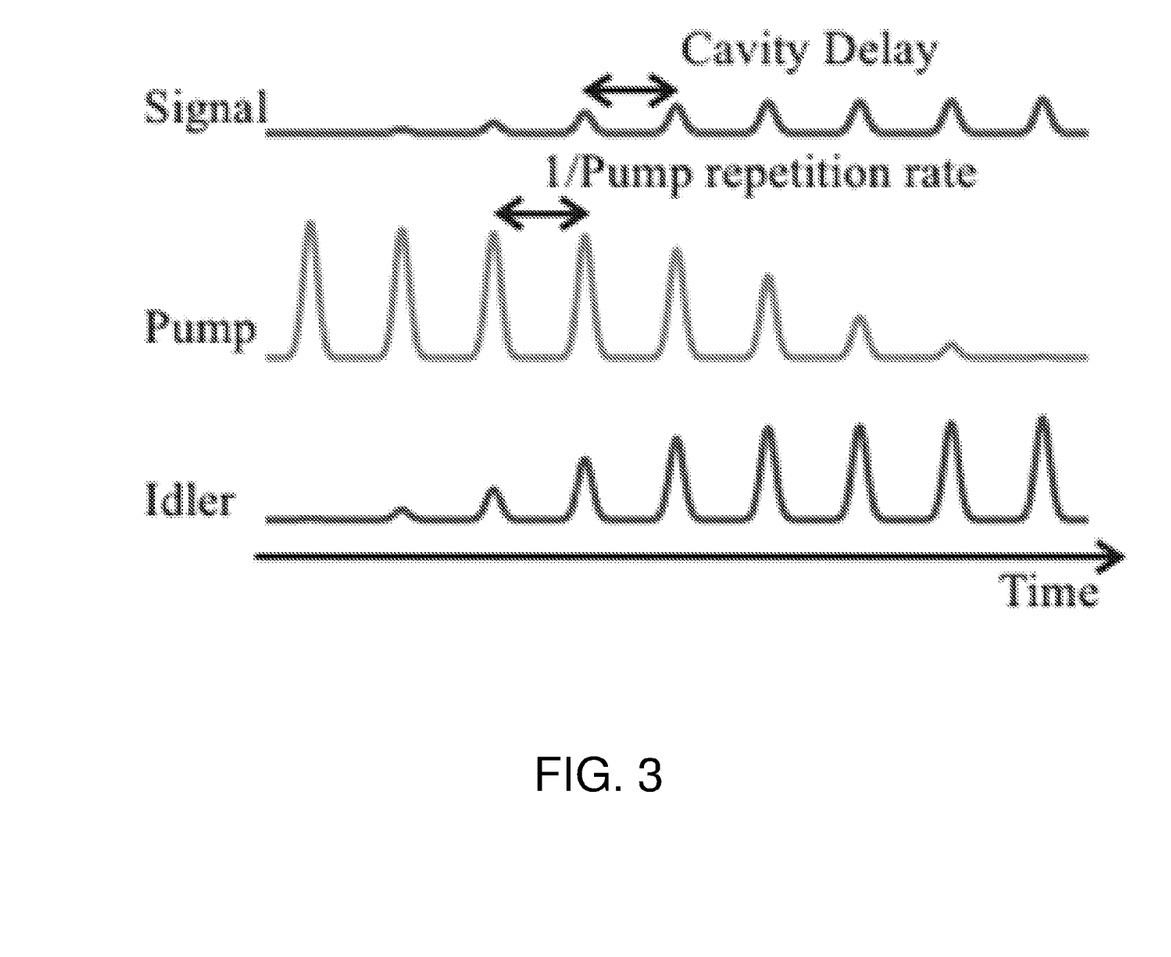
FIG. 3 illustrates the temporal variation of pulsed pump light, pulsed signal light and pulsed idler light for the synchronously-pumped pulsed OPO system of FIG. 2.

As shown in FIG. 3, the variable optical delay arrangement 160 is used to control the optical path length of the optical cavity 120 so as to match a round-trip delay experienced by the pulsed signal light 106 in the optical cavity 120 to a repetition period of the pulsed pump light 105 for the temporal overlap in the optical fibre 104 between a pulsed signal pulse 106 and a subsequent pump pulse 105 and thereby maximise the optical power of the pulsed signal light 106 and/or the pulsed idler light 108. Controlling the optical path length of the optical cavity 120 in this way maximises the optical power of the pulsed output light 126.

Tuning of the pulsed output light 126 is accomplished using the variable spectral filtering arrangement 170. Specifically, the first pair of prisms 172 spatially disperses the different frequencies of the pulsed signal light 106 in a plane of the variable aperture or slit 174. The variable aperture or slit 174 acts as a passband filter which transmits a range of the different frequencies of the pulsed signal light 106 across a spectral passband which has a central frequency defined by a position of a centre of the variable aperture or slit 174 and which has a spectral bandwidth defined by a width of the variable aperture or slit 174. The second pair of prisms 178 spatially recombines the spatially dispersed pulsed signal light 106 after transmission through the variable aperture or slit 174. The selection of the frequency and the spectral bandwidth of the recycled pulsed signal light 106 is directly transferred to the frequency and the spectral bandwidth of the output light 126.

The optical power control arrangement 180 is used to control the average optical power and therefore also the peak optical power of the recycled pulsed signal light 106. Such control over the average optical power of the recycled pulsed signal light 106 in the optical cavity 120 provides an additional means to control different non-linear phenomena in the optical fibre 104 (e.g. self- and cross-phase modulation) and can be used to mitigate or control the induced shift in the spectral position of the pulsed output light 126 and the power of the pulsed output light 126.

One of ordinary skill in the art will understand that each of the pump pulse train 105, the signal pulse train 106 and the idler pulse train 108 may be represented by a corresponding optical frequency comb in the optical frequency domain. However, the frequency spacing of the frequency combs of both the pulsed pump light 105 and the pulsed signal light 106 can fluctuate as a result of several independent stochastic processes. For some technical applications, it may be desirable to generate pulsed output light 126 in the form of pulsed idler light 108 having an optical frequency comb which is stabilised, not just in the relative frequency separation between the different frequency lines of the frequency comb, but also in the absolute frequency of the different frequency lines. This requires that the optical frequency combs of the pulsed pump light 105 and the pulsed signal light 106 are locked not just in the relative frequency separation between the different frequency lines of the frequency combs, but also in the absolute frequency of the different frequency lines of the frequency combs.

A carrier envelope offset and repetition rate of the pulsed pump light 105 is stabilised using a conventional method. The pump laser 110 may include a carrier envelope offset and repetition rate stabilization arrangement (not shown) for this purpose. The carrier envelope offset and repetition rate stabilization arrangement 190 is then used to stabilise the carrier envelope offset and repetition rate of the pulsed signal light 106 i.e. the carrier envelope offset and repetition rate stabilization arrangement 190 is used to stabilise not just the relative frequency separation between the different frequency lines of the frequency comb of the pulsed signal light 106, but also the absolute frequency of the different frequency lines of the frequency comb of the pulsed signal light 106. Specifically, the partially reflecting mirror 194 reflects a portion of the recycled pulsed signal light 106. The reflected portion of the recycled pulsed signal light 106 is directed by the highly reflective mirror 196 onto the f-2f detector arrangement 198. The controller 199 controls the variable optical delay arrangement 192 so as to rapidly and finely vary the round-trip delay of the signal pulses 106 in the optical cavity 120 by translating each of the optically transmissive wedges of the further variable optical delay arrangement 192 in a direction across the path of the pulsed signal light 106 in the optical cavity 120 so as to vary a distance propagated by the pulsed signal light 106 in the optical cavity 120 through the optically transmissive wedges on a sub-fs time scale to maximise the temporal overlap in the optical fibre 104 between the recycled signal pulse 106 and a subsequent pump pulse 105 to thereby maximise the optical power of the pulsed signal light 106 and/or the pulsed idler light 108 and lock the inverse of the round-trip delay experienced by the recycled signal pulse 106 in the optical cavity 120 to the repetition rate of the stabilised pulsed pump light 105.

To lock the absolute frequency comb offset for the frequency comb of the pulsed signal light 106, carrier envelope offset stabilisation is used. The carrier envelope offset (i.e. the absolute frequency) of the pulsed signal light 106 is locked using the f-to-2f detector arrangement 198. As will be understood by one of ordinary skill in the art, the f-to-2f detector arrangement 198 doubles the optical frequency of a portion of the pulsed signal light 106 and beats the frequency-doubled pulsed signal light 106 together with the original fundamental-frequency pulsed signal light 106 on a photodetector to generate an electrical beat signal and the controller 199 uses the electrical beat signal to finely adjust the further variable optical delay arrangement 192 to lock the carrier envelope offset of the pulsed signal light 106 (i.e. the absolute frequency of the different frequency lines of the frequency comb of the pulsed signal light 106) to a desired carrier envelope offset value and thereby lock the frequency comb of the pulsed signal light 106 to the frequency comb of the pulsed pump light 105 in absolute frequency. This results in pulsed idler light 108 and therefore also the pulsed output light 126 having a frequency-stabilised optical frequency comb.

From the foregoing description of the synchronously-pumped pulsed OPO system 102, one of ordinary skill in the art will understand that the pump laser 110 may have a fixed frequency or may be tunable. In particular, one of ordinary skill in the art will understand that the OPO system 102 enables a pump laser 110, at a fixed frequency, to be converted to widely tuneable light at both a higher idler frequency and a lower signal frequency, with the signal and idler frequencies determined by the properties of the pump laser 110, the structure of the optical fibre 104, the properties of the gas contained in the hollow core of the optical fibre 104 including at least one of the composition, temperature, pressure, distribution, and profile of the gas in the hollow core of the optical fibre 104, the properties of the optical elements 114, 133, 170, 116, 160, 190, 134 and 112 in the optical cavity 120, and the arrangement of the optical elements 114, 133, 170, 116, 160, 190, 134 and 112 in the optical cavity 120. The use of a hollow-core fluid-filled optical fibre 104 may provide lower group velocity dispersion and group velocity walk-off in the hollow-core fluid-filled optical fibre 104 and therefore a broader phase-matching and parametric gain bandwidth compared with known fibre OPOs based on solid-core optical fibres. In effect, this allows the OPO system 2 to be tuned across a wider tuning range than known fibre OPOs based on solid-core optical fibres. The signal and idler frequencies may be located in the vacuum ultraviolet, deep ultraviolet, visible and infrared region of the electromagnetic spectrum. The signal light 106 and idler light 108 can be in spectral ranges outside the transmission band of glass-fibres and crystal materials. Both the frequency and spectral bandwidth of the light output 126 from the OPO system 102 can be tuned as described above.

The pump and output power levels can be very high and the lifetime of the OPO system 102 can be highly extended relative to known OPOs such as fibre OPOs based on solid-core optical fibres. Conversely, the use of the hollow-core fluid-filled optical fibre 104 may result in the same output optical power level for a lower optical pump power level relative to known fibre OPOs based on solid-core optical fibres.

One of ordinary skill in the art will also understand that the optical frequency of the pump light 105 is different from a lasing transition frequency or an absorption resonance frequency of the gas in the hollow core of the optical fibre 104 and that the OPO system 102 does not require an active lasing transition to emit the signal light 106 and the idler light 108. In other words, the gas in the hollow core of the optical fibre 104 does not need to exhibit a lasing transition at the frequency of operation or store any energy.

The OPO system 102 may be operated to generate pulsed idler light 108 having a stabilised optical frequency comb.

One of ordinary skill in the art will understand that various modifications are possible to the OPO systems 2, 102 and methods described above. For example, although the fluid in the hollow-core optical fibre 4, 104 is described as a gas, it may be possible to use a liquid in the hollow-core optical fibre 4, 104. The OPO system 2, 102 may include a hollow-core fluid-filled optical waveguide of any kind.

Rather than recycling the signal light 6, 106 and coupling the idler light 8, 108 out of the optical cavity 20, 120 as output light 26, 126, the OPO system 2, 102 may be configured to recycle the idler light 8, 108 and couple the signal light 6, 106 out of the optical cavity 20, 120 as output light 26, 126. A portion of the signal light 6, 106 may be recycled and the remaining portion of the signal light 6, 106 may be coupled out of optical cavity 20, 120. A portion of the idler light 8, 108 may be recycled and the remaining portion of the idler light 8, 108 may be coupled out of optical cavity 20, 120. In some embodiments, the OPO system 2, 102 may be configured to recycle all of the signal light 6, 106 and all of the idler light 8, 108 i.e. without coupling any of the signal light 6, 106 or any of the idler light 8, 108 out of the optical cavity 20, 120. Such embodiments may be useful for example when performing measurements using the intra-cavity signal light 6, 106 or the intra-cavity idler light 8, 108 on a sample inserted in the optical cavity 20, 120. Where at least a portion of the idler light 8, 108 is recycled, one of ordinary skill in the art will understand that the recycled idler light 8, 108 may be spectrally filtered using a variable spectral filtering arrangement like variable spectral filtering arrangement 170. Similarly, where at least a portion of the pulsed idler light 108 is recycled, one of ordinary skill in the art will understand that the repetition rate of pulsed recycled idler light 108 may be varied using a variable optical delay arrangement like variable optical delay arrangement 160 for varying an optical path length of the optical cavity 120 to ensure temporal overlap in the optical fibre 104 between a subsequent pump pulse 105, a signal pulse 106 and an idler pulse 108. Where at least a portion of the pulsed idler light 108 is recycled, one of ordinary skill in the art will also understand that the carrier envelope offset and repetition rate of the pulsed idler light 108 may be stabilised using a carrier envelope offset and repetition rate stabilization arrangement like the carrier envelope offset and repetition rate stabilization arrangement 190. Rather than the optical cavity 20, 120 having a travelling-wave configuration in the form of a ring configuration as described with reference to FIGS. 1-3, the optical cavity may have a standing-wave configuration. For example, the optical cavity may have a linear configuration or a Fabry-Perot configuration.

Rather than including a variable optical delay arrangement 60, 160 which includes a translation stage 18, 118 and a pair of re-direction mirrors 16, 116 mounted on the translation stage 18, 118, the OPO system 2, 102 may include a variable optical delay arrangement 60, 160 which includes a translation stage and a retroreflector mounted on the translation stage. Alternatively, the OPO system 2, 102 may include a variable optical delay arrangement which includes two optically transmissive wedges in the optical cavity 20, 120, and one or more translation stages for translating the two optically transmissive wedges in a direction across the path of the signal light in the optical cavity so as to vary a distance propagated by the signal light through the wedges.

It is also possible to control the spectral phase of the pulses of signal light 106 inside the optical cavity 120, and therefore also the phase of the pulses of idler light 108 output from the OPO system 102 by means of one or more dispersive elements inside the optical cavity 120 e.g. prism/grating pairs, chirped mirrors or glass plates with adjustable thickness or path, or acousto-optic programmable dispersive filters. Such a method can be used to control the chirp, duration and pulse shape of the pulses of idler light 108 output from the OPO system 102. If signal light 106 is coupled out of the optical cavity 120, such a method can be used to control the chirp, duration and pulse shape of the pulses of signal light 106 output from the OPO system 102.

Rather than using a variable spectral filtering arrangement 170 including spatially dispersive elements such as the pair of prisms 172 or a pair of gratings (not shown) and a variable aperture or slit 174 mounted on a translation stage 176, frequency selection can be achieved using linear filtering devices which simply transmit a small spectral band of the signal in the cavity. Typical examples are a tuneable spectral filter based on liquid crystals or an acousto-optic device.

Additionally or alternatively, the frequency and spectral bandwidth of the light output 126 from the OPO system 102 can be varied rapidly in real time using a more advanced scheme of frequency selection by temporally chirping the recycled pulsed signal light 106 and tuning the delay between a pulse of the signal light 106 and a subsequent pulse of the pump light 105 such that only a certain portion of the chirped pulse of the signal light 106 overlaps with the subsequent pulse of the pump light 105 inside the optical fibre 104. The round-trip delay experienced by the signal light 106 in the optical cavity 120 thus determines which spectral components of the pulse of the signal light 106 get amplified. Consequently, the frequency and spectral bandwidth of the light output 126 from the OPO system 102 can be varied rapidly by controlling the variable optical delay arrangement 160. This may allow the frequency and spectral bandwidth of the light output 126 from the OPO system 102 to be varied extremely rapidly, and does not depend on wavelength-specific optics.

Rather than controlling the peak power of every pulse of signal light 106 in the same way, a fast attenuator such as an acousto-optic or an electro-optic device (e.g. a Pockel's cell) can address different pulses of signal light 106 in the pulse train separately and therefore allow for more advanced configurations where the repetition rate of the pump and cavity resonant frequency (1/cavity delay) are not just equal but are proportional by an integer number. For example, an optical path length of the optical cavity 120 and/or a repetition period of the train of pump pulses 105 may be selected so that the round-trip delay experienced by the recycled signal pulses 106 in the optical cavity 120 is an integer number of times the repetition period of the train of pump pulses 105. An optical path length of the optical cavity 120 and/or a repetition period of the train of pump pulses 105 may be selected so that the repetition period of the train of pump pulses 105 is an integer number of times the round-trip delay experienced by the recycled signal pulses 106 in the optical cavity 120. Thus, a fast attenuator such as an acousto-optic or an electro-optic device may be used to control the average power of the pulsed signal light 106 and/or the pulsed idler light 108.

Rather than locking the inverse of the round-trip delay experienced by the recycled signal pulse 106 in the optical cavity 120 to the repetition rate of the stabilised pulsed pump light 105, the controller 199 of the carrier envelope offset and repetition rate stabilization arrangement 190 may control the variable optical delay arrangement 192 so that the inverse of the round-trip delay experienced by the recycled signal pulses 106 in the optical cavity 120 is locked to an external electrical reference frequency. For example, the f-to-2f detector arrangement 198 may include a fast photodetector for detecting a repetition rate of the recycled signal pulses 106 in the optical cavity 120, the controller 199 may receive the external electrical reference frequency, and the controller 199 may control the variable optical delay arrangement 192 so as to minimise a difference between the detected repetition rate and the external electrical reference frequency.

Rather than using an f-2f technique to stabilise the carrier envelope offset of the pulsed signal light 106 or the pulsed idler light 108, a 0-f technique or scheme may be used such as a monolithic carrier envelope phase detection technique using self-phase modulation and difference frequency generation.

Although the pump laser 10, 110 is described as being located outside the optical cavity 20, 120 of the OPO system 2, 102, one of ordinary skill in the art will understand that in some embodiments, the optical cavity of the pump laser may at least partially overlap with the optical cavity of the OPO system, wherein the optical fibre 104 is located in both the optical cavity of the pump laser and the optical cavity of the OPO system. In other words, the OPO system may be described as an intra-cavity OPO system.

Although the disclosure has been described in terms of preferred embodiments as set forth above, it should be understood that these embodiments are illustrative only and that the claims are not limited to those embodiments. Those skilled in the art will be able to make modifications and alternatives to the described embodiments in view of the disclosure which are contemplated as falling within the scope of the appended claims. Each feature disclosed or illustrated in the present specification may be incorporated in any embodiment, whether alone or in any appropriate combination with any other feature disclosed or illustrated herein. In particular, one of ordinary skill in the art will understand that one or more of the features of any embodiment of the present disclosure described above with reference to the drawings may produce effects or provide advantages when used in isolation from one or more of the other features of the same embodiment of the present disclosure and that different combinations of the features are possible other than the specific combinations of the features of the embodiments of the present disclosure described above.

The skilled person will understand that in the preceding description and appended claims, positional terms such as 'above', 'along', 'side', etc. are made with reference to in the accompanying drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features.

The use of reference signs in the claims should not be construed as limiting the scope of the claims.

The invention claimed is:

1. An optical parametric oscillator (OPO) system, comprising:
    an optical waveguide including a hollow core containing a fluid, wherein the optical waveguide is configured to receive pump light and to convert the pump light into signal light and idler light via a third order non-linear optical effect;
    an optical feedback arrangement at least one of for recycling at least a portion of the signal light or for recycling at least a portion of the idler light in an optical cavity that includes the optical waveguide; and
    a variable spectral filtering arrangement in the optical cavity for at least one of spectrally filtering the recycled signal light in the optical cavity or spectrally filtering the recycled idler light in the optical cavity,
    wherein the variable spectral filtering arrangement is configured to transmit light having a wavelength in a variable spectral passband having at least one of a tuneable centre wavelength or a variable spectral bandwidth.

2. The OPO system as claimed in claim 1, wherein the optical feedback arrangement is configured to couple at least one of at least a portion of the signal light or at least a portion of the idler light out of the optical cavity.

3. The OPO system as claimed in claim 1, wherein the optical waveguide is configured to convert the pump light into the signal light and the idler light via four-wave mixing.

4. The OPO system as claimed in claim 1, wherein the OPO system is configured to control at least one of a composition, a temperature, a pressure, a distribution, a profile, and a concentration of the fluid in the hollow-core optical waveguide.

5. The OPO system as claimed in claim 1, further comprising first and second gas cells, wherein the first gas cell is configured to control the supply of fluid to a first end of the optical waveguide and the second gas cell is configured to control the supply of fluid to a second end of the optical waveguide.

6. The OPO system as claimed in claim 5, wherein the first end of the optical waveguide is located within a chamber of the first gas cell and the second end of the optical waveguide is located within a chamber of the second gas cell and wherein at least one of the first gas cell comprises a valve for controlling the supply of fluid to the chamber of the first gas cell or the second gas cell comprises a valve for controlling the supply of fluid to the chamber of the second gas cell.

7. The OPO system as claimed in claim 1, further comprising an optical pump source for generating the pump light and—wherein at least one of:
    the optical pump source has a fixed optical frequency; or
    the optical pump source is located outside the optical cavity and the optical cavity is configured to receive the pump light from the optical pump source or the optical pump source has an optical pump feedback arrangement defining an optical pump cavity, wherein the optical pump cavity and the optical cavity of the optical parametric oscillator system at least partially overlap and the optical waveguide is located in both the optical pump cavity and the optical cavity of the OPO system.

8. The OPO system as claimed in claim 1, wherein the pump light is continuous wave (CW).

9. The OPO system as claimed in claim 1, wherein the pump light comprises pulsed pump light in the form of a train of pump pulses, the signal light comprises pulsed signal light in the form of a train of signal pulses, and the idler light comprises pulsed idler light in the form of a train of idler pulses and wherein at least one of:

the OPO system comprises a variable optical delay arrangement for varying an optical path length of the optical cavity; or at least one of an optical path length of the optical cavity or a repetition period of the train of pump pulses are configured so that at least one of the round-trip delay experienced by the recycled signal light in the optical cavity or the round-trip delay experienced by the recycled idler light in the optical cavity is equal to the repetition period of the train of pump pulses.

10. The OPO system as claimed in claim 9, wherein at least one of an optical path length of the optical cavity or a repetition period of the train of pump pulses are configured so that at least one of the round-trip delay experienced by the recycled signal light in the optical cavity or the round-trip delay experienced by the recycled idler light in the optical cavity is an integer number of times the repetition period of the train of pump pulses, or wherein at least one of an optical path length of the optical cavity or a repetition period of the train of pump pulses are configured so that the repetition period of the train of pump pulses is an integer number of times the round-trip delay experienced by the recycled signal light in the optical cavity and/or the round-trip delay experienced by the recycled idler light in the optical cavity.

11. The OPO system as claimed in claim 9, wherein at least one of:

the OPO system comprises a variable dispersion arrangement at least one of for controlling the spectral phase or chirp of the pulses of signal light in the optical cavity or for controlling the spectral phase or chirp of the pulses of idler light in the optical cavity;

a carrier envelope offset and repetition rate of the pulsed pump light is stabilized;

the OPO system comprises at least one of a carrier envelope offset and repetition rate stabilization arrangement configured to stabilise a carrier envelope offset and repetition rate of the pulsed pump light or a carrier envelope offset and repetition rate stabilization arrangement configured to at least one of stabilise a carrier envelope offset and repetition rate of the pulsed signal light or stabilise a carrier envelope offset and repetition rate of the pulsed idler light;

the OPO system comprises an arrangement at least one of for varying an average optical power of the signal light in the optical cavity or for varying an average optical power of the idler light in the optical cavity or comprising an arrangement at least one of for varying the optical power of different pulses of signal light in the optical cavity or for varying the optical power of different pulses of idler light in the optical cavity.

12. The OPO system as claimed in claim 1, wherein the signal light includes a signal frequency, wherein the idler light includes an idler frequency, and wherein at least one of:

the pump light includes a pump frequency, and the sum of the signal frequency and the idler frequency is equal to twice the pump frequency;

the pump light includes first and second pump frequencies, wherein the first and second pump frequencies are different, and the sum of the signal frequency and the idler frequency is equal to the sum of the first and second pump frequencies, or wherein one or both of the frequencies of the signal light and the idler light is in the vacuum UV, the deep UV, the UV, the visible or the IR regions of the electromagnetic spectrum.

13. The OPO system as claimed in claim 1, wherein at least one of:

the optical waveguide comprises a hollow-core fluid-filled optical fibre; or the fluid comprises a liquid or a gas.

14. The OPO system as claimed in claim 1, wherein the optical cavity has a ring, or a travelling-wave, configuration, or wherein the optical cavity has a linear, or a standing-wave, configuration.

15. An optical parametric oscillation (OPO) method, comprising:

converting pump light into signal light and idler light in a fluid-filled hollow-core optical waveguide via a third order non-linear optical effect;

at least one of recycling at least a portion of the signal light or recycling at least a portion of the idler light in an optical cavity that includes the optical waveguide; and at least one of:

spectrally filtering the recycled signal light in the optical cavity so as to select at least one of the centre wavelength, or the spectral bandwidth, of the recycled signal light in the optical cavity; or spectrally filtering the recycled idler light in the optical cavity so as to select at least one of the centre wavelength, or the spectral bandwidth, of the recycled idler light in the optical cavity.

16. The OPO method as claimed in claim 15, further comprising coupling at least one of at least a portion of the signal light or at least a portion of the idler light out of the optical cavity.

17. The OPO method as claimed in claim 15, further comprising selecting an optical frequency of the pump light to be different from a lasing transition frequency or an absorption resonance frequency of the fluid.

18. The OPO method as claimed in claim 15, wherein the signal light includes a signal frequency, wherein the idler light includes an idler frequency, and wherein at least one of:

the pump light includes a pump frequency, and the sum of the signal frequency and the idler frequency is equal to twice the pump frequency;

the pump light includes first and second pump frequencies, wherein the first and second pump frequencies are different, and the sum of the signal frequency and the idler frequency is equal to the sum of the first and second pump frequencies, or wherein one or both of the frequencies of the signal light and the idler light is in the vacuum UV, the deep UV, the UV, the visible or the IR regions of the electromagnetic spectrum.

19. The OPO method as claimed in claim 15, wherein at least one of:

the optical waveguide comprises a hollow-core fluid-filled optical fibre; or the fluid comprises a liquid or a gas.

20. The OPO method as claimed in claim 15, wherein the optical cavity has a ring, or a travelling-wave, configuration, or wherein the optical cavity has a linear, or a standing-wave, configuration.

* * * * *